(No Model.)
J. H. THOMAS & J. E. OFFUTT.
COUPLING IRON FOR TEDDERS.
No. 344,604. Patented June 29, 1886.
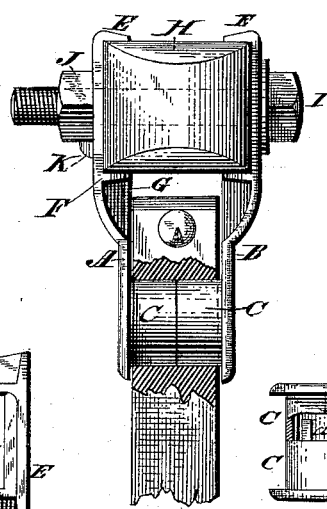
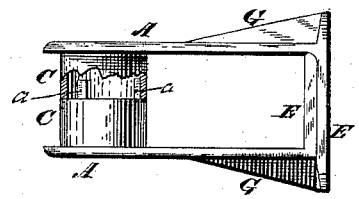
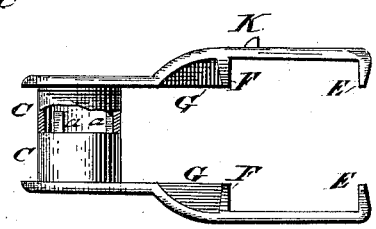
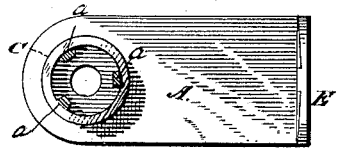
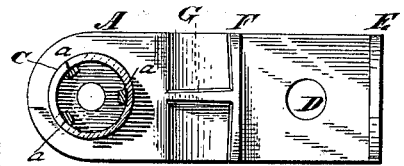
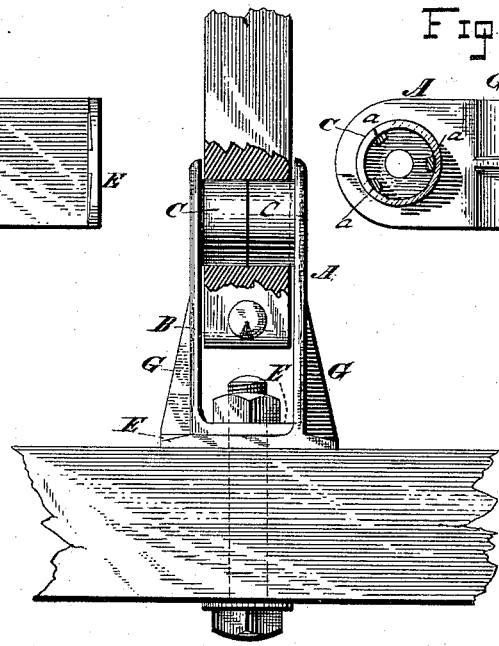
WITNESSES
INVENTORS
John H. Thomas
Joseph E. Offutt
By Toulmin & Gemmes
his Attorneys.

UNITED STATES PATENT OFFICE.

JOHN H. THOMAS AND JOSEPH E. OFFUTT, OF SPRINGFIELD, OHIO; SAID JOSEPH E. OFFUTT ASSIGNOR TO SAID JOHN H. THOMAS.

COUPLING-IRON FOR TEDDERS.

SPECIFICATION forming part of Letters Patent No. 344,604, dated June 29, 1886.

Application filed November 9, 1885. Serial No. 182,190. (No model.)

*To all whom it may concern:*

Be it known that we, JOHN H. THOMAS and JOSEPH E. OFFUTT, citizens of the United States, residing at Springfield, in the county of Clark and State of Ohio, have invented certain new and useful Improvements in Coupling-Irons for Tedders, of which the following is a specification, reference being had therein to the accompanying drawings.

This invention relates to certain new and useful improvements in coupling-irons for coupling the tedder-arms and the radial arms together, and for coupling the radial arms to the main frame of the tedder; and it has for its object, first, to provide a coupling-iron for flexibly connecting the tedder-arms with the radial arms, of such construction as to be adapted to form a rigid and fixed connection with the tedder-arms and a pivotal connection with the radial arms; and, second, to provide a coupling-iron of such construction at one end as to adapt it to be connected with the main frame of the machine, still preserving the same construction at the other end as that employed in the corresponding end of the coupling for the tedder-arms and radial arms.

In the accompanying drawings, forming a part of this specification, and on which like reference-letters indicate corresponding features, Figure 1 represents a plan view of the coupling and a portion of the main frame, showing the radial arm and the tedder-arm coupled therewith; Fig. 2, a plan view of the frame-coupling; Fig. 3, a view looking at the inner face of one member of the coupling; Fig. 4, a plan view of the tedder-arm coupling; Fig. 5, a view looking at the inner face of one member of the last-mentioned coupling.

The letter A designates the one member of the coupling, and the letter B the other member, the same being constructed preferably of malleable iron. Each of these members is provided with an integral tubular sleeve, C, which extends in a lateral direction from the inner side thereof, the two sleeves meeting at or about midway between the members. In order to insure the sleeves keeping in line with each other, we provide one of them with projecting points *a*, which fit snugly within the other sleeve. These may, however, be omitted, though we prefer to use them. The sleeves being hollow, their diameter may therefore be increased without involving an increase in the cost of production and in the weight thereof, the object of increasing the diameter being to present a greater superficial area of contact-surface with the radial arm, thereby lessening the rapidity of the wear of the same. Nevertheless, the sleeves may be made solid.

The tedder-arm coupling has each of its members provided with bolt-holes D and inwardly-projecting flanges E and shoulders F, the latter being strengthened by ribs G, which also strengthen the adjacent part of the coupling proper. The space between the flanges E and shoulders F serves to receive the upper end of the tedder-arm H, while a bolt, I, having a nut, J, is employed to make the connection secure. The outer face of one of the members is provided with a lug, K, which serves as a stop to prevent the nut from unscrewing. The frame-coupling, or the coupling at the end of the radial arm nearest the main frame of the machine, has the flanges E increased in length, and disposed so as to overlap each other, as shown in Figs. 1 and 2. The shoulders F are omitted, and the strengthening-ribs G are preferably formed on the outer faces of the members. The flanges E are provided each with a bolt-hole, by means of which and a bolt the coupling is secured to a cross-piece of the tedder-frame.

In Letters Patent issued to us March 16, 1886, No. 337,891, for combined rakes and tedders, we have claimed the coupling-iron with the radius-arm and tedder-arm, and of the application upon which said patent was issued the present application is a division.

Having thus fully described our invention, what we claim, and desire to secure by Letters Patent, is—

1. A coupling-iron consisting of two members and a pivot portion connected to each of the members.

2. A coupling-iron consisting of two members, each of which is provided with an integral pivot-sleeve.

3. A coupling-iron consisting of two members having flanges and a pivot portion connected to each of the members.

4. A coupling-iron consisting of two members, each of which is provided with an integral sleeve, and both of which are provided with inwardly-projecting flanges.

5. A coupling-iron consisting of two members, each of which is provided with an integral pivot-sleeve, and both of which are provided with bolt-holes and inwardly-projecting flanges and shoulders.

6. A coupling-iron consisting of two members, each of which is provided with an integral pivot-sleeve, and both of which are provided with inwardly-projecting and overlapping flanges having each a bolt-hole.

7. A coupling-iron consisting of two members, each of which is provided with an integral pivot-sleeve, one of said sleeves being provided with projections which engage the other sleeve.

8. The combination, with the tedder-frame and the coupling having overlapping ends and sleeves secured thereto, of the radial arm pivotally mounted on the sleeve, the tedder-arm, and the coupling having ribs and a sleeve, and secured rigidly thereto and pivotally to the radial arm.

In testimony whereof we affix our signatures in presence of two witnesses.

JOHN H. THOMAS.
JOSEPH E. OFFUTT.

Witnesses:
A. A. YEATMAN,
WILBER COLVIN.